United States Patent [19]
Wober et al.

[11] Patent Number: 5,719,958
[45] Date of Patent: Feb. 17, 1998

[54] SYSTEM AND METHOD FOR IMAGE EDGE DETECTION USING DISCRETE COSINE TRANSFORMS

[75] Inventors: Munib A. Wober, Wakefield; Yibing Yang, Arlington; Michael L. Reisch, Carlisle, all of Mass.

[73] Assignee: Polaroid Corporation, Cambridge, Mass.

[21] Appl. No.: 440,651

[22] Filed: May 15, 1995

Related U.S. Application Data

[63] Continuation-in-part of Ser. No. 159,795, Nov. 30, 1993.
[51] Int. Cl.$^6$ .............. G06K 9/48; G06K 9/36; G06K 9/46; G06K 9/40
[52] U.S. Cl. .............. 382/199; 382/250; 382/266; 382/263; 348/420; 358/433
[58] Field of Search .................. 382/199, 250, 382/266, 263, 232, 233, 235; 358/433, 429; 348/394–425

[56] References Cited

U.S. PATENT DOCUMENTS

| | | | |
|---|---|---|---|
| 5,109,451 | 4/1992 | Aono | 382/232 |
| 5,150,433 | 9/1992 | Daly | 382/56 |
| 5,268,853 | 12/1993 | Tanaka | 364/725 |
| 5,331,585 | 7/1994 | Tanaka | 364/725 |
| 5,359,549 | 10/1994 | Tanaka | 364/725 |
| 5,424,743 | 6/1995 | Ghiglia | 342/203 |
| 5,533,138 | 7/1996 | Kim | 382/232 |
| 5,555,029 | 9/1996 | Kim | 348/607 |
| 5,563,662 | 10/1996 | Kishi | 348/420 |
| 5,565,920 | 10/1996 | Lee | 348/398 |

OTHER PUBLICATIONS

"Two–Dimensional Signal and Image Processing" by Jae S. Lim, 1990 Prentice–Hall Inc., pp. 476–495.
"Fundamentals of Image Processing" by A.K. Jain, 1989 Prentice–Hall Inc., pp. 347–362, 382–389.
Vision in Man and Machine, Levine, Martin D., 1985 pp. 260–266.

*Primary Examiner*—Leo Boudreau
*Assistant Examiner*—Bipin Shalwala
*Attorney, Agent, or Firm*—Robert A. Sabourin

[57] ABSTRACT

The image processing system of the present invention provides electronic edge detection in keeping with ISO/JPEG/MPEG international compression standards for electronic imaging. Specifically, a novel electronic image processing system for edge detection includes: an image acquisition device for acquiring and representing an image as an electronic image signal; a video memory for storing the image signal; a display for displaying the image signal; a raster to block converter for converting the image signal into block format; a DCT/IDCT processor for transforming the converted signal in accordance with predetermined basis matrices stored in a basis matrix memory; a mask multiplier for generating a mask multiplied signal in accordance with predetermined Laplacian matrices stored in an A matrix memory; a buffer for storing the mask multiplied signal; and a controller for controlling the image processing system in accordance with instructions from a central processing unit (CPU).

11 Claims, 9 Drawing Sheets

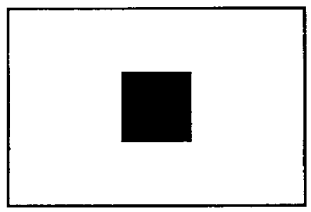
FIG. 3A
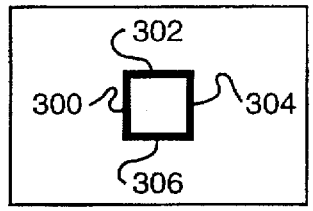
FIG. 3B
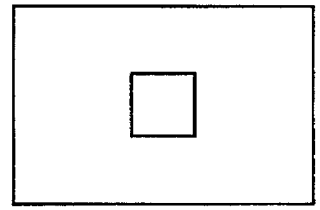
FIG. 3C
FIG. 4A
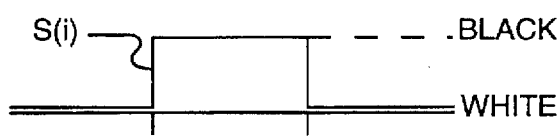
FIG. 4B
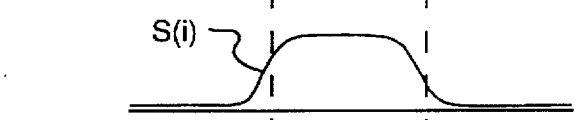
FIG. 4C
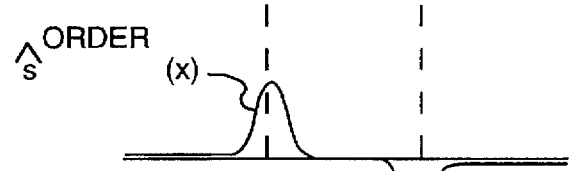
FIG. 4D
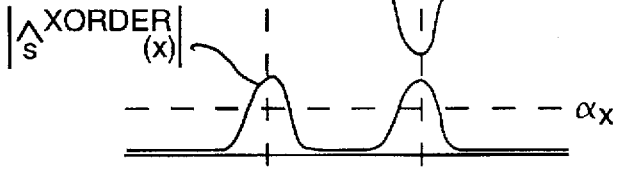
FIG. 4E
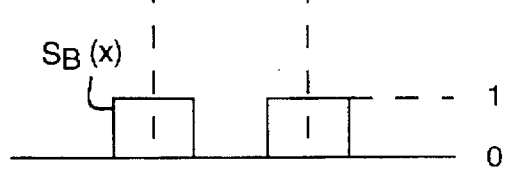

SYSTEM AND METHOD FOR IMAGE EDGE DETECTION USING DISCRETE COSINE TRANSFORMS

RELATED APPLICATIONS

This application is a continuation-in-part of U.S. patent application Ser. No. 08/159,795 filed 30 Nov. 1993 by Munib A. Wober and Michael L. Reisch. Furthermore, this application is related to concurrently filed and commonly assigned U.S. patent application Ser. Nos. 08/440,666, 08/441,383, 08/440,639, 08/440,631, 08/441,000, 08/440,647 and U.S. Pat. No. 5,629,778.

BACKGROUND OF THE INVENTION

1. Field of the Invention

This invention relates generally to an improved image processing system and methods for use with this system. More particularly, the invention relates to a system and methods thereto for producing a reflected image and an edge detected image.

2. Description of the Prior Art

Images can be thought of as two-dimensional representations of some visual reality that is distributed in space and/or time. Ordinarily, they are what the human visual system perceives as variations in external stimuli such as brightness, color, and sometimes depth cues. While over the years any number of techniques have been developed to capture and reproduce images, their representation as continuous, discrete, or digital signals which can be manipulated, processed or displayed through the use of computers or other special purpose electronic hardware is the most recent technique, now well-established, which has a variety of beneficial applications. For instance, while in electronic form, images can be enhanced to create special visual effects, restored, coded for transmission to distant locations, reconstructed, displayed, or converted to some other tangible form.

FIG. 1 illustrates a conventional electronic image processing system where an image of a subject (not shown) is acquired by an image acquisition device such as the electronic camera 10 or the image scanner 12. The computer 18 receives an electronic representation of the image from the image acquisition device and thereafter processes the image electronically to provide any number of known image processing functions such as resizing, sharpening, noise removal, reflection or edge detection. The processed image can be stored in a diskette 16, displayed on an user monitor 20, printed on a printer 14, or transmitted to a remote monitor 26. Operator interaction with the system is facilitated by use of the keyboard 22 or the mouse 24. Of course, the components shown in FIG. 1 are merely exemplary rather than all inclusive of the many equivalent devices known by those skilled in the art. For instance, the image acquisition device includes any device for electronically acquiring an image such as an electronic camera, a scanner, a camcorder, a charge coupled device, a charge injected device, etc. It is noteworthy that the image processing need not necessarily occur solely in the computer 18. Indeed, various phases or aspects of the image processing could occur in any one of the image acquisition devices and/or input/output devices.

Image processing can occur in either the spatial domain or the frequency domain. An image is said to reside in the spatial domain when the values of the parameters used to describe it, such as brightness, have a direct correspondence with spatial location. In the frequency domain, the image of the spatial domain may be represented by a series of frequency components in the form of trigonometric functions which, when summed for each image data point, i.e. pixel, yield the value of the parameter used to characterize the image for that image data point in the spatial domain, and such a representation may be extended to cover all image data points of an image.

In the spatial domain, original image data may be conveniently represented as image data points in a first spatial matrix designated $s(j,i)$ for the two-dimensional case where the lower case, s, designates the spatial domain, i is the index of rows and j is the index of columns. In the frequency domain, matrices can also be used to mathematically describe an image as a set of the transform coefficients (also referred to as frequency coefficients) which represent frequency data in a transform matrix conventionally designated $S(v,u)$ where the upper case, S, designates the frequency domain, u is the number of rows and v is the number of columns.

Spatial image data points may be transformed to frequency space using transformations such as Fourier transforms or discrete even cosine transforms (i.e. DECTs further abbreviated as DCTs). When the transformation involved is a discrete cosine transformation, the frequency domain is referred to as the DCT domain and the frequency coefficients are referred to as DCT coefficients. Conventionally, transforming data from the spatial domain to the frequency domain is referred to as a forward transformation, whereas transforming data from the frequency domain to the spatial domain is referred to as an inverse transformation. Hence, a forward discrete cosine transformation is defined as a transform that maps an image from the original image data points $s(j,i)$ in the spatial domain to DCT coefficients $S(v,u)$ in the DCT domain according to the basis function of the forward DCT, whereas an inverse discrete even cosine transformation (i.e. IDECT or IDCT) is defined as a transform that maps the DCT coefficients $S(v,u)$ from the DCT domain to reconstructed image data points $ŝ(j,i)$ in the spatial domain according to the basis function of the IDCT. In this paper, reconstructed image data points which are produced from the IDCT will always be labelled as $ŝ$.

Processing an electronic image in an image processing system such as that shown in FIG. 1 often includes edge detection, defined as the detection of a boundary or contour where a significant physical change occurs. The highlighting through edge detection of selected image characteristics such as color, brightness, contrast, texture, reflectance and perceived depth makes edge detected images highly intelligible.

Edge detection is useful in many applications such as object identification, image segmentation and pattern recognition. Examples of edge detection techniques concerning changes in image intensities are detailed in "Two-Dimensional Signal and Image Processing" by Jae S. Lim, Prentice-Hall (1990), pp. 476–495 which includes methods based on Laplacian transforms, the Marr & Hildreth technique, and signal modeling. Further discussion of conventional edge detection techniques using both gradient operators and compass operators is detailed in "Fundamentals of Digital Image Processing" by A. K. Jain, Prentice-Hall (1989), pp. 347–357. The latter reference gives examples of Stochastic, Sobel, Kirsch and Laplacian methods.

The primary object of the current invention is to provide a system of edge detection and image reflection which is more efficient than existing systems and which conforms to international compression standards such as ISO/IEC 10918-1, Section A.3.3 set by the International Organization of Standards (ISO), Joint Photographic Experts Group (JPEG) and similar standards recognized by the Motion Picture Experts Group (MPEG). Other objects of the invention will, in part, appear hereinafter and, in part, be obvious when the following detailed description is read in conjunction with the drawings.

SUMMARY OF THE INVENTION

The image processing system of the present invention provides electronic edge detection in keeping with ISO/JPEG/MPEG international compression standards for electronic imaging. Specifically, a novel electronic image processing system for edge detection includes: an image acquisition device for acquiring and representing an image as an electronic image signal; a video memory for storing the image signal; a display for displaying the image signal; a raster to block converter for converting the image signal into block format; a DCT/IDCT processor for transforming the converted signal in accordance with predetermined basis matrices stored in a basis matrix memory; a mask multiplier for generating a mask multiplied signal in accordance with predetermined Laplacian matrices stored in an A matrix memory; a buffer for storing the mask multiplied signal; and a controller for controlling the image processing system in accordance with instructions from a central processing unit (CPU).

BRIEF DESCRIPTION OF THE DRAWINGS

The aforementioned aspects and other detailed features of the invention are described in conjunction with the accompanying drawings in which the same reference numerals are used throughout for denoting corresponding elements and wherein:

FIG. 3A is an image;

FIG. 3B is the image of FIG. 3A which has been subjected to the edge detection circuitry of FIG. 2A;

FIG. 3C is the edge detected image of FIG. 3B which has further been subjected to a conventional thinning algorithm;

FIG. 4A is an ideal representation of the image of FIG. 3A;

FIG. 4B is a more realistic (actual) representation of the image of FIG. 3A;

FIG. 4C is a graphical representation of the first derivative of the waveform of FIG. 4B;

FIG. 4D is a graphical representation of the absolute values of the waveform of FIG. 4C in relation to a predetermined threshold value $\alpha$;

FIG. 4E is a graphical binary representation of the waveform of FIG. 4D;

FIG. 10A is an original image; and FIG. 10B is a reflected version of the image of FIG. 10A.

DETAILED DESCRIPTION OF THE PREFERRED EMBODIMENTS

Figure 1:
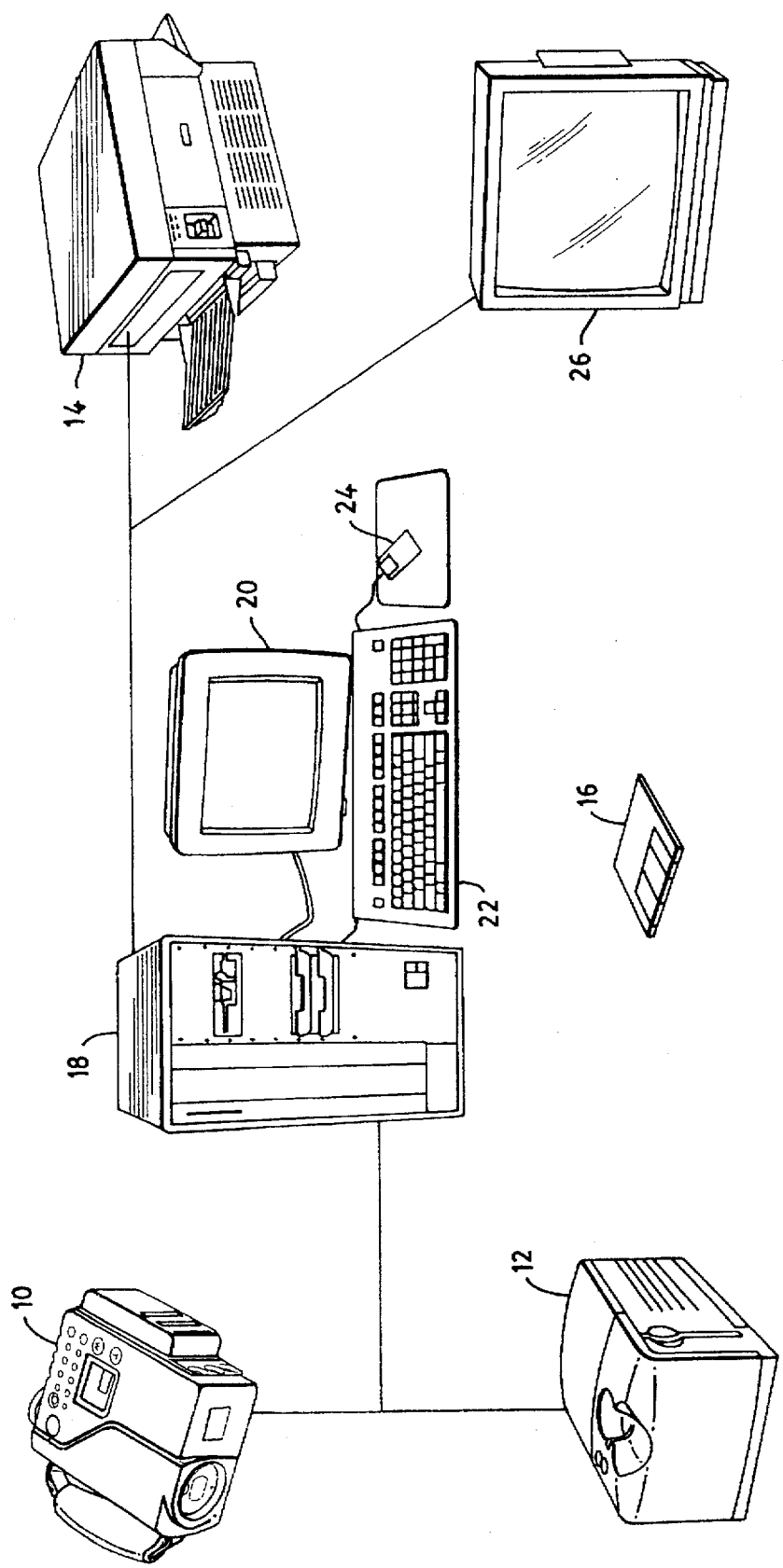
FIG. 1 is a preferred embodiment of an electronic imaging system according to the invention.
Figure 2:
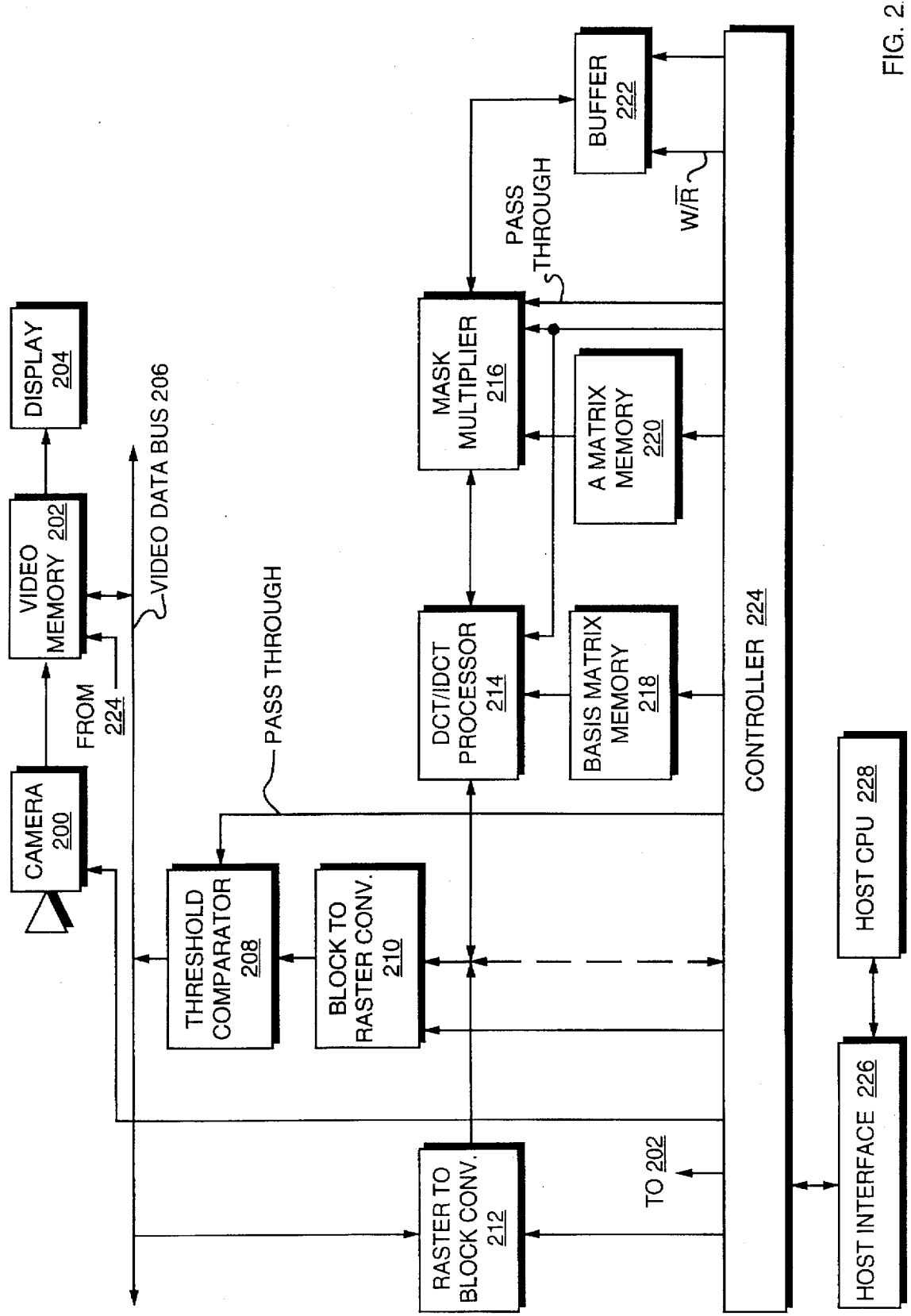
FIG. 2A is a detailed block diagram of portions of the electronic imaging system for edge detection and image reflection.
FIG. 2B is a block diagram of the DCT/IDCT processor 214 of FIG. 2B.

The invention relates to a system, and methods thereto, for producing a reflected image and an edge detected image. The basic components of the electronic image processing system of FIG. 1 are detailed as shown in the system of FIG. 2A. The inventive system includes a camera 200 connected to a video memory 202 which in turn is connected to a display 204 and a controller 224. A video data bus 206 connects the video memory 202 to a threshold comparator 208 and a raster to block converter 212. The raster to block converter 212 is connected to both a controller 224 and a DCT/IDCT processor 214. The threshold comparator 208 is connected to both a block to raster converter 210 and the controller 224. The raster to block converter 210 is also connected to the controller 224. The DCT/IDCT processor 214 is connected to a mask multiplier 216, a basis matrix memory 218 and the controller 224. Both an A matrix memory 220 and a buffer 222 are connected between the mask multiplier 216 and the controller 224. A host CPU 228 is connected to the controller 224 via a host interface 226.

Figure 2B:
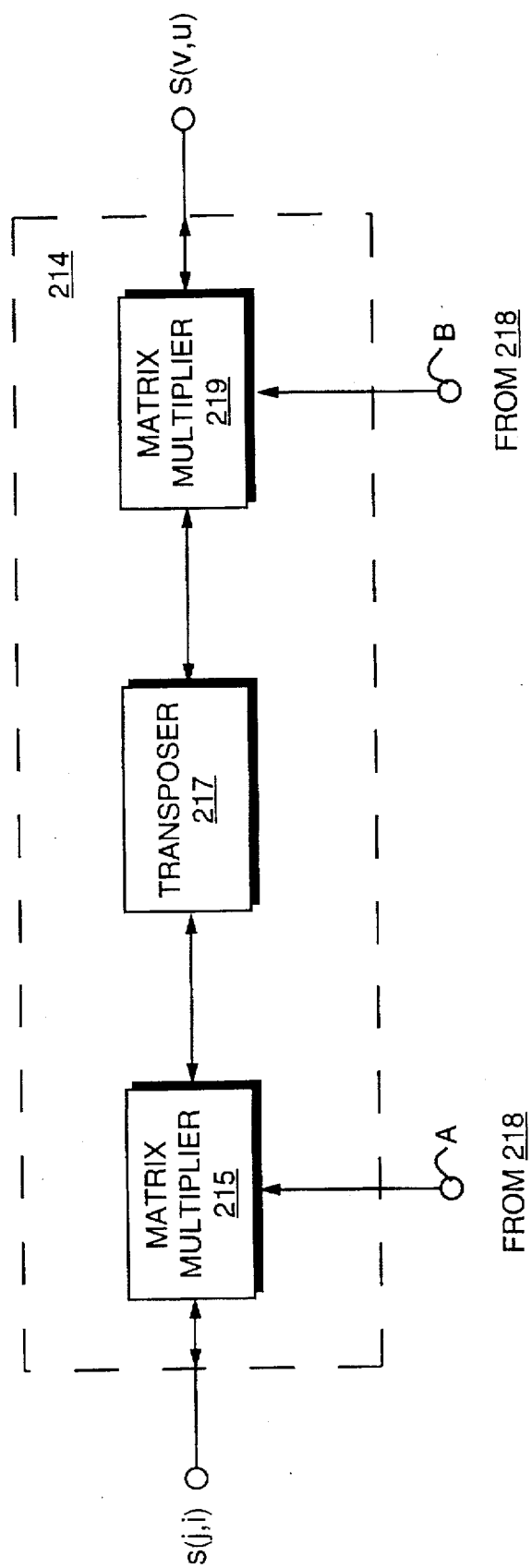

In FIG. 2B, the DCT/IDCT processor 214 is shown to include a matrix multiplier 215, a transposer 217 and a matrix multiplier 219. Operation of the image processing system of FIGS. 2A and 2B, useful for improved edge detection and image reflection, will be more easily understood in view of the following sections entitled DCT Mathematics, Edge Detection Using DCTs, Detailed Operation of the Edge Detection Hardware and Image Reflection.

1. DCT MATHEMATICS

The following mathematical discussion sets forth certain fundamentals relating to forward and inverse discrete cosine transforms.

A forward DCT is defined as a mathematical process for transforming image data points from the spatial domain to the frequency or, more particularly, DCT domain. Image data points s(i) in one dimensional form may be transformed from the spatial domain to related DCT coefficients S(u) for the frequency domain according to equation (1).

$$S(u) = C_u \sqrt{\frac{2}{N}} \sum_{i=0}^{N-1} s(i) \cos \frac{(2i+1)u\pi}{2N} \quad (1)$$

for $0 \leq u \leq (N-1)$, where:

S(u) represents the DCT coefficients;

s(i) represents the image data points;

N represents the number of image data points;

$$C_u = \frac{1}{\sqrt{2}} \text{ for } u = 0; \text{ and}$$

$$C_u = 1 \text{ for } u \neq 0.$$

The DCT coefficients S(u) are derived from equation (1) where the cosine normalized basis terms are determined for a preselected value of N=16, where $0 \leq u \leq 15$ and $0 \leq i \leq 15$. The value for S(0) is determined for u=0 by summing each of the image data points s(i) for $0 \leq i \leq (N-1)$ times the cosine terms of equation (1). The value for S(1) is determined as the summation of image data points s(i) times the cosine terms for u=1. This procedure, which indexes first on u and then on i, is continued to derive all sixteen DCT coefficients S(0) through S(15).

The various terms of equation (1) can alternatively be expressed in matrix notation, where each cosine term represents an element of a matrix defined as a forward DCT basis matrix $FB_{COS}$, each image data point represents an element of a first spatial matrix s(i), and each DCT coefficient represents an element of a DCT matrix S(u) of DCT coefficients.

An inverse discrete cosine transformation IDCT is defined as a mathematical process for transforming DCT coefficients from the DCT domain to reconstructed image data points in the spatial domain. DCT coefficients S(u) in one dimensional form are transformed from the DCT domain to reconstructed image data points ŝ(i) in the spatial domain according to equation (2).

$$\hat{s}(i) = \sqrt{\frac{2}{N}} \sum_{u=0}^{N-1} C_u S(u) \cos \frac{(2i+1)u\pi}{2N} \quad (2)$$

for $0 \leq i \leq (N-1)$, where ŝ(i) represents the reconstructed image data points.

If the DCT coefficients S(u) of equation (1) are derived from a set of image data points s(i), the resampling ratio (defined as the resampling rate divided by the initial sampling rate) equals 1, and the reconstructed image data points ŝ(i) of equation (2) are derived from the corresponding DCT coefficients S(u), then s(i)≡ŝ(i) and the process is referred to as lossless since the reconstructed data points ŝ(i) are identical to the original data points s(i), within limits. The reconstructed image data points ŝ(i) are derived from equation (2) for N=16, $0 \leq i \leq 15$ and $0 \leq u \leq 15$. The value for ŝ(0) is determined for i=0 by summing each of the DCT coefficients S(u) times the cosine terms of equation (2). The value for ŝ(i) is determined as the summation of DCT coefficients S(u) times the cosine terms for i=1. This procedure is continued, indexed as before, to derive all sixteen reconstructed image data points ŝ(0) through ŝ(15). Note that the conventional inverse DCT of equation (2) for transforming data in one dimensional form includes the same cosine argument (i.e. same basis functions) used in the conventional forward DCT of equation (1) so that the reconstructed image data points ŝ(i) coincide with the original image data points s(i).

Parent application '795 discloses a hybrid IDCT, shown in one dimensional form in equation (3) below, for determining reconstructed image data points ŝ(x) that fall between the original image data points in the spatial domain for any real number x.

$$\hat{s}(x) = \sqrt{\frac{2}{N}} \sum_{u=0}^{N-1} C_u S(u) \cos \frac{(2x+1)u\pi}{2N} \quad (3)$$

The hybrid IDCT of equation (3) actually is applicable for the special case where the spacing between pixels in the spatial image is equal to one. In the more general case the spacing in the horizontal direction is defined as $\delta_x$ and equation (3) could be rewritten as:

$$s(x) = \sqrt{\frac{2}{N}} \sum_{u=0}^{N-1} C_u S(u) \cos \frac{(2x+\delta x)u\pi}{2N\delta x} \quad (4)$$

The above examples for one dimensional standard and hybrid DCT equations can be extended, as known by those skilled in the art, to multidimensional formats. For instance, Section A.3.3 of ISO/IEC 10918-1 of the JPEG international standards for digital compression using discrete cosine transforms defines the forward DCT in two dimensional form as:

$$S(v,u) = \frac{1}{4} C_v C_u \sum_{j=0}^{7} \sum_{i=0}^{7} s(j,i) \cos \frac{(2j+1)v\pi}{16} \cos \frac{(2i+1)u\pi}{16} \quad (5)$$

for $0 \leq u \leq 7$ and $0 \leq v \leq 7$, while defining the IDCT in two dimensional form as:

$$\hat{s}(j,i) = \frac{1}{4} \sum_{v=0}^{7} \sum_{u=0}^{7} C_v C_u S(v,u) \cos \frac{(2j+1)v\pi}{16} \cos \frac{(2i+1)u\pi}{16} \quad (6)$$

for $0 \leq i \leq 7$ and $0 \leq j \leq 7$, where:

S(v,u) represents DCT coefficients;
s(j,i) represents original image data points;
ŝ(j,i) represents the reconstructed image data points;

$$C_u = \frac{1}{\sqrt{2}} \text{ for } u = 0;$$

$$C_u = 1 \text{ for } u \neq 0;$$

$$C_v = \frac{1}{\sqrt{2}} \text{ for } v = 0; \text{ and}$$

$$C_v = 1 \text{ for } v \neq 0;$$

According to equation (5), a first spatial matrix s(j,i) (representing a two dimensional 8×8 group of original image data points in the spatial domain) can be forward DCT transformed to an 8×8 DCT matrix S(v,u) in the frequency domain having 64 DCT coefficients that can be related to the 64 image data points through mapping. An 8×8 DCT basis matrix, i.e. forward transform matrix, is derived from the cosine expression of equation (5) by indexing over the full range of values for j and i and v and u. Similarly, the 8×8 DCT matrix S(v,u) is inverse DCT transformed via equation (6) to an 8×8 reconstructed spatial matrix ŝ(j,i) using the same basis functions of equation (5).

The two dimensional DCT and hybrid IDCT equations of parent application '795, supra, for processing image data points located at any real number indices x and y throughout the appropriate ranges can be rewritten as equations (7) and (8), respectively.

$$S(v,u) = \frac{2}{N} \sum_{u=0}^{N-1} \sum_{v=0}^{N-1} C_v C_u s(j,i) \cos \frac{(2j+1)v\pi}{2N} \cos \frac{(2i+1)u\pi}{2N} \quad (7)$$

$$\hat{s}(y,x) = \frac{2}{N} \sum_{v=0}^{N-1} \sum_{u=0}^{N-1} C_v C_u S(v,u) \cos \frac{(2y+\delta y)v\pi}{2N\delta y} \cos \frac{(2x+\delta x)u\pi}{2N\delta x} \quad (8)$$

The forward DCT equation (7) can actually be considered as a special case of the more general form where the grid spacing is set at $\delta y = \delta x = 1$ and y and x are selected as discrete variables j and i, respectively. For equation (7), $0 \leq j \leq (N-1)$ and $0 \leq i \leq (N-1)$ and for equation (8), $0 \leq y \leq (N-1)\delta y$ and $0 \leq x \leq (N-1)\delta x$. For consistency in terminology throughout this application, image data points resulting from an IDCT are termed as reconstructed image data points and labeled ŝ, such as ŝ(y,x) for a two dimensional plane.

2. DETAILED OPERATION OF THE EDGE DETECTION HARDWARE

The edge detection system of FIG. 2A is useable for one or two dimensional differentiation. The system includes a digital camera 200 used both for image acquisition in raster format, as well as analog-to-digital conversion. Thus, the digital camera 200 digitizes an image (not shown) which is thereafter stored in a video memory 202 that is arranged with both an output port to drive the display 204 and a random access input/output port connected to the video data bus 206. The raster to block converter 212 reads successive 8×8 pixel blocks, depicted as matrices s(j,i), of the image beginning horizontally row by row with the first row starting at the top left corner and terminating at the bottom right corner of the last row for each matrix. The blocks are preferably each read with a two pixel overlap both horizontally and vertically (for the two dimensional case) to provide continuity and to minimize aliasing. Each block of pixels is sent from the converter 212 to the DCT/IDCT processor 214 where the blocks are sequentially processed, i.e. the processor generates DCT coefficients according to equation (7) for two-dimensional processing in which case, $$S(v,u) = (FB_{COS} \times s(j,i))^T \times FB_{COS} \quad (9)$$

where:

S(v,u) is the 8×8 element DCT matrix;

s(j,i) is the 8×8 element spatial domain matrix;

$FB_{COS}$ is the forward DCT basis matrix; and $(FB_{COS} \times s(j,i))^T$ represents a transpose.

Predetermined forward, inverse, modified and combined DCT and DST basis matrices are loaded from the host CPU 228 through the host interface 226 and the controller 224 for storage into the basis matrix memory 218. Similarly, the host CPU 228 loads the Laplacian coefficient matrix A(v,u) into A matrix memory 220, and the threshold value α into the threshold comparator 208. The timing and operation of each component of the system of FIG. 2A is controlled by the controller 224.

Image data points s(j,i) representing the original image are imaged by digital camera 200, stored in video memory 202, then transferred to the raster to block converter 212 via video data bus 206 where the serial data is converted to a preferable format of 8×8 image point data blocks overlapped by two pixels on each edge. The DCT coefficients S(v,u), as previously described, are generated in DCT/IDCT processor 214 by matrix multiplying the forward DCT basis matrix $FB_{COS}$ retrieved from memory 218 times the 8×8 block of image data points received from converter 212. Specifically, s(j,i) is multiplied times the forward basis matrix $FB_{COS}$ in matrix multiplier 215 (see FIG. 2B) to form a first product which is sent to the transposer 217. In transposer 217 the first product is transposed, and in matrix multiplier 219 the transposed first product is multiplied times the forward basis matrix FB to produce the two dimensional DCT signal S(v,u). The DCT coefficients S(v,u) are then output from the right side port of the processor 214 to the mask multiplier 216 which produces the matrix B(v,u) by mask multiplying S(v,u) times A(v,u). Mask multiplying of course denotes point-by-point multiplication of corresponding elements of two matrices rather than conventional matrix product multiplication as provided in the DCT processor 214. The buffer 222 is a random access off-screen memory large enough to store at least eight rows of the image represented as B(v,u) received from the mask multiplier 216. The buffer 222 can be any size buffer capable of storing information received from the mask multiplier 216, although preferably it would be large enough to store at least 8 rows of the image. For instance, an 8×8 element buffer could be used for processing one 8×8 block of data at a time, or a buffer large enough to store the complete image could be used if desired.

To reconstruct the 8×8 image data point blocks, B(v,u) passes from buffer 222 through the mask multiplier 216 without processing to the DCT/IDCT processor 214 which generates the (for example) second derivative IDCT coefficients $\hat{s}''(y,x)$ by performing an inverse DCT on B(v,u). The IDCT is accomplished by first multiplying the IDCT basis matrix IB received from memory 218 times the terms of B(v,u) in matrix multiplier 219 to generate a first matrix product. Then, a transposed first matrix product is generated in transposer 217 and finally, the IDCT coefficients corresponding to reconstructed image data points $\hat{s}''$ are generated in matrix multiplier 215 by multiplying the first transpose matrix times the IDCT matrix. Block to raster converter 210 receives $\hat{s}''(y,x)$ from processor 214, then discards two rows and columns of pixels along each edge of $\hat{s}''(y,x)$ to account for the earlier two point overlap during the forward DCT transformation.

Finally the signals are transmitted from the converter 212 through the threshold comparator 208 in pass through mode so that the differentiated image represented by $\hat{s}''(y,x)$ is written directly to the video memory 202 and thereafter viewed on the display 204. Alternatively, each pixel is subjected to a preset threshold value α, thereby generating a binary image. The regions of the image where the Laplacian value exceeds the threshold value will have pixel values of one, other regions will have pixel values of zero.

The hardware of FIGS. 2A and 2B can be used to implement either one or two dimensional differentiation according to the methods of FIGS. 5 and 9 as described in detail hereinafter. The two dimensional differentiation signal s(j,i), which is segmented in block 212 into 8×8 blocks preferably overlapped by two points both horizontally and vertically, is received in the DCT/IDCT processor 214 shown in detail in FIG. 2B. The processor 214 produces DCT coefficients per equation (7). A forward basis matrix and an inverse basis matrix are precalculated by the CPU 228 and stored in basis matrix memory 218. For an even order of differentiation, the basis matrices are DCT basis matrices and for an odd order of differentiation, the basis matrices are DST basis matrices. A unit matrix is also predetermined and stored in memory 218 for the one dimensional case.

The forward basis matrix is received at ports A and B from memory 218. The forward basis matrix from port A is multiplied in matrix multiplier 215 times s(j,i) to produce a first matrix which is transposed in transposer 217. The transposed first matrix is then multiplied in matrix multiplier 219 times the forward basis matrix from port B to produce the DCT signal S(v,u). The DCT signal is then sent to mask multiplier 216 which produces a matrix B(v,u) by mask multiplying S(v,u) times A(v,u), where A(v,u) is determined according to equation (13). The mask multiplied signal is then stored in buffer 222.

To reconstruct the two dimensional image data blocks, the mask multiplied signal is transferred from buffer 222 through the mask multiplier 216 without processing to the DCT/IDCT processor 214. The inverse basis matrices, from memory 218 are received at ports A and B. A first matrix is generated in matrix multiplier 219 by multiplying the mask multiplied signal times the inverse basis matrix received at port B. The first matrix is transposed in transposer 217 then multiplied in matrix multiplier 215 times the inverse basis matrix received at port A to generate a reconstructed signal ŝ(j,i). Block to raster converter 210 receives ŝ(j,i) from processor 214, then discards the proper number of pixels along the appropriate edge to account for earlier overlap.

Finally the signals are transmitted from the converter 212 through the threshold comparator 208 in pass through mode so that the differentiated image represented by ŝ"(y,x) is written directly to the video memory 202 and thereafter viewed on the display 204. Alternatively, each pixel is subjected to a preset threshold value α as previously described, for the purpose of generating a binary image.

Figure 5:
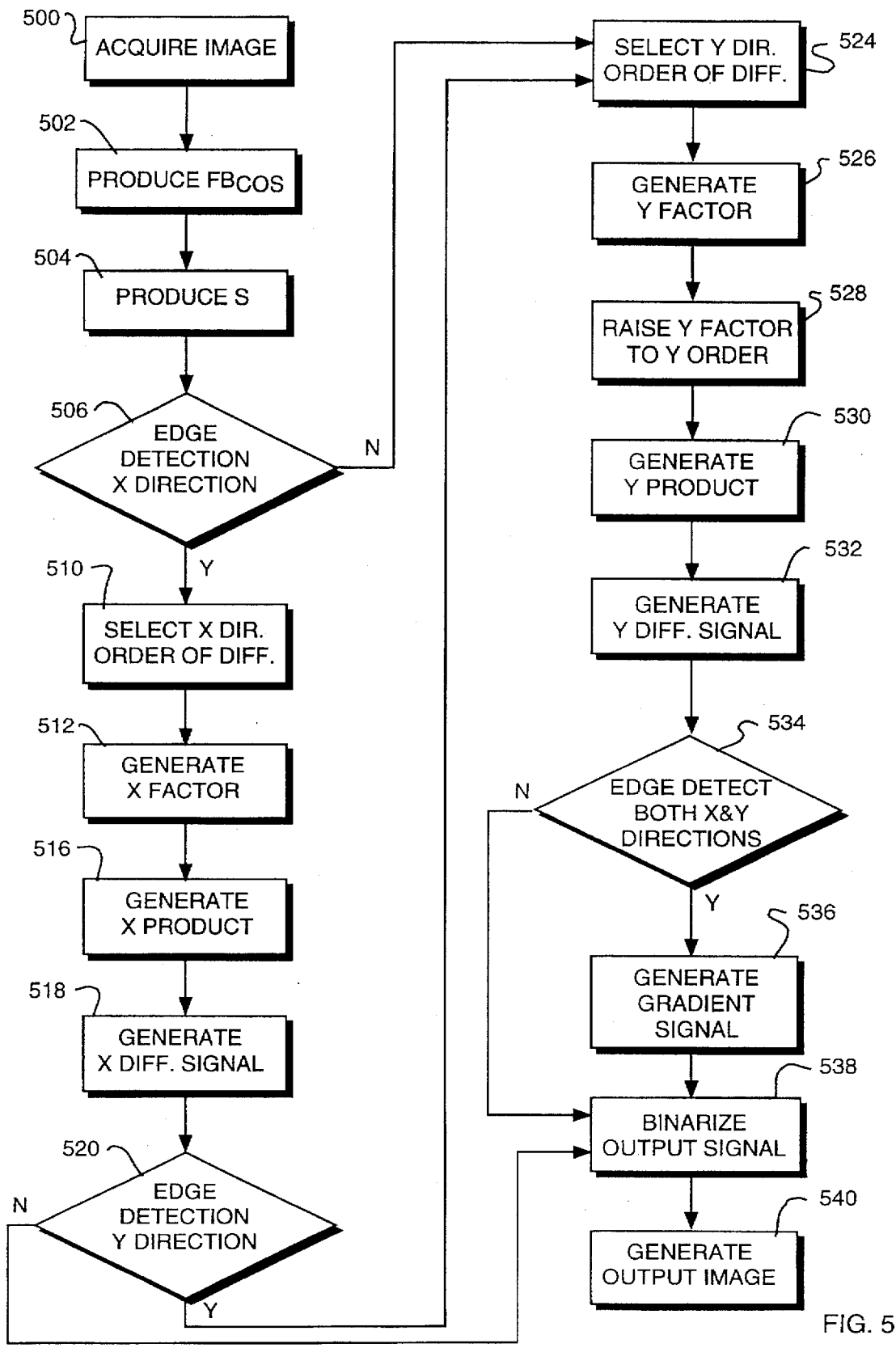
FIG. 5 is a flowchart of a first preferred edge detection method for application to the system of FIG. 2A.

To implement one dimensional differentiation on the hardware of FIGS. 2A and 2B according to the preferred method of FIG. 5, a unit matrix is calculated in CPU 228 and stored in memory 218 along with the basis matrices previously described. The DCT/IDCT processor 214 (see FIG. 2B) receives the signal from converter 212 and produces DCT coefficients per equation (7) where the spatial domain signal is represented as s(j,0) or s(0,i). A first matrix is generated by multiplying the forward basis matrix received at port A from memory 218 times either s(j,0) or s(0,i). The first matrix is transposed in transposer 217, then the transposed matrix is multiplied times the unit matrix received at port B from memory 218 to generate DCT signal S(v,0) or S(0,u). The DCT signal is then sent to mask multiplier 216 which produces a matrix B(v,0) or B(0,u) by mask multiplying S times A, where A(v,0) or A(0,u) is determined according to equation (12). In this one-dimensional case, $A(v,0)=(v\pi/N\delta y)^{Yorder}$ for a Yorder derivative and $A(0,u)=(u\pi/N\delta x)^{Xorder}$ for an Xorder derivative. The mask multiplied signal is then stored in buffer 222.

To reconstruct the one dimensional image data blocks, the mask multiplied matrix B is transferred from buffer 222 through the mask multiplier 216 without processing to the DCT/IDCT processor 214 which then produces the appropriate Xorder or Yorder differentiated IDCT coefficients $\hat{s}^{Xorder}(x)$ or $\hat{s}^{Yorder}(y)$ by performing an IDCT on B. The B matrix is multiplied in matrix multiplier 214 times the unit matrix from port B to produce a first matrix which is transposed in transposer 217. The transposed matrix is multiplied in matrix multiplier 215 times the IDCT matrix received from port A to produce the reconstructed coefficients $\hat{s}^{Xorder}(x)$ or $\hat{s}^{Yorder}(y)$. Block to raster converter 210 receives the reconstructed coefficients from processor 214 then discards any pixels as necessary to compensate for earlier overlapping.

Finally, the differentiated signals are transmitted from the converter 210 through the threshold comparator 208 in pass through mode so that the differentiated image represented by $\hat{s}^{Xorder}(x)$ or $\hat{s}^{Yorder}(y)$ is written directly to the video memory 202 and thereafter viewed on the display 204. Alternatively, each pixel is subjected to the preset threshold value α, thereby generating a binary image. The regions of the image where the differentiated signal value exceeds the threshold value will have pixel values of one, other regions will have pixel values of zero.

3. EDGE DETECTION USING DCTs

FIGS. 3A, 3B and 3C cumulatively illustrate the effect of edge detection upon an image where FIG. 3A represents an original image, FIG. 3B represents the image of FIG. 3A after edge detection, and FIG. 3C represents the edge detected image of FIG. 3B which has further been subjected to a conventional thinning algorithm. One such thinning algorithm incorporated by reference herein is described in "Fundamentals of Digital Image Processing", supra, pp. 382-389.

A first preferred method for the edge detection system of FIG. 2A according to the invention is shown in the flowchart of FIG. 5. This method provides one-dimensional edge detection in either the X or Y direction as well as two-dimensional edge detection using a gradient. This and the other methods applicable to the inventive image processing system of FIG. 2A can readily be expanded to any number of dimensions although two-dimensional analysis is most frequently used.

An image such as that shown in FIG. 3A is divided into image data points, i.e. pixels, whereby characteristics of each pixel are represented for each discrete location i and j representing coordinates in the horizontal and vertical directions, respectively. In block 500 of FIG. 5 the input image of FIG. 3A is acquired by a system designed to acquire and convert the input image into an electrical signal s(j,i) at a predetermined initial sampling rate. The acquiring system can include, but is not limited to, the following devices and their functional equivalents: a lens system; an imaging array; a scanner; a charge coupled device and a charge injected device. It is well known in the imaging art that an image can be represented by an electrical signal, such as s(j,i) which in turn can be mathematically represented in calculus or matrix form. The input image of FIG. 3A is thus ideally represented by s(i) or s(j), as shown in FIG. 4A for one dimension, although the actual one dimensional signal is more realistically portrayed in FIG. 4B. Gray scale levels for the signals of FIGS. 4A and 4B range from logic high indicating maximum black to logic low indicating maximum white, although the reverse limits are equally applicable.

In block 502 the forward DCT basis matrix $FB_{COS}$ is generated from the cosine terms of equation (5). The DCT matrix S(v,u) is then generated in block 504 by first multiplying the DCT basis matrix $FB_{COS}$ times the input signal s(j,i) and then normalizing the resultant curve according to the constants of equation (5). If edge detection is desired in the X direction, then decision block 506 is answered in the affirmative, otherwise decision block 506 is answered in the negative and the method continues with edge detection in the Y direction at block 524. Edge detection in the X direction follows the steps provided by blocks 510 through 518. In block 510 a predetermined X direction order of differentiation, Xorder, is selected where selection can occur by operator, retrieval from memory, or real time processing according to predetermined criteria. In general for edge detection, there is no resampling during differentiation although, if desired, one could choose to resample either before or after differentiation. If resampling is desired, then resampling after differentiation is preferred due to computational speed considerations.

For a clear understanding of the underlying mathematics of the edge detection method, the one-dimensional hybrid IDCT of equation (4) is differentiated to the first order in the X direction so that $$\hat{s}'(x) = -\sqrt{\frac{2}{N}} \sum_{u=0}^{N-1} C_u \frac{u\pi}{N\delta_x} S(u) \sin\left(\frac{(2x+\delta x)u\pi}{2N\delta_x}\right) \quad (10)$$

where $\delta_x$ represents the spacing of the original uniform grid. From equation (10) the X factor of block 512 is generated and defined as $$-\frac{u\pi}{N\delta_x},$$

and the X product of block 514 is generated and defined as $$\left(-\frac{u\pi}{N\delta_x}\right)^{Xorder} S(u),$$

where the Xorder is the predetermined order of differentiation in the X direction as selected in block 510. The differentiation of equation (4) in the X direction where the Xorder is odd takes the form $$\left(-\frac{u\pi}{N\delta_x}\right)^{Xorder} S(u)\sin\left(\frac{(2x+\delta x)u\pi}{2N\delta_x}\right)$$

whereas the differentiation of equation (4) in the X direction where the Xorder is even takes the form $$\left(-\frac{u\pi}{N\delta_x}\right)^{Xorder} S(u)\cos\left(\frac{(2x+\delta_x)u\pi}{2N\delta_x}\right).$$

Figures 6, 7:
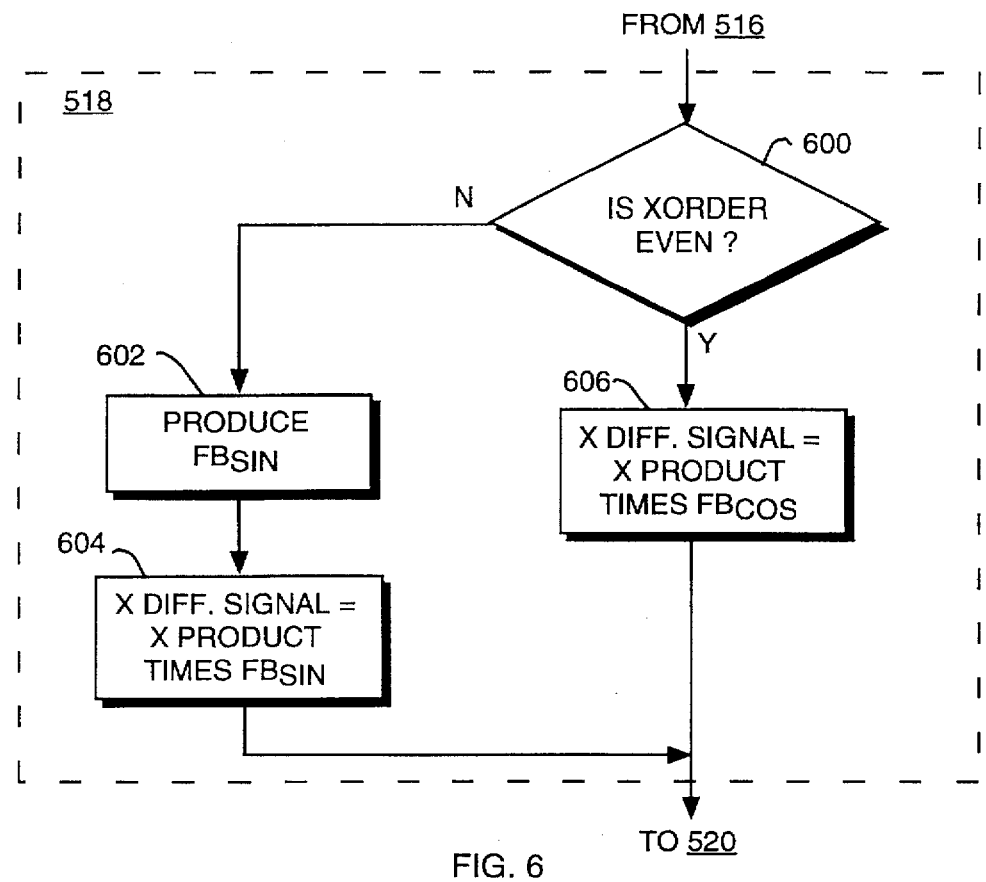
FIG. 6 is a flowchart showing further detailed steps for generating an X direction differential signal according to block 518 of FIG. 5.
FIG. 7 is a flowchart showing further detailed steps for generating a Y direction differential signal according to block 532 of FIG. 5.

The X factor is first generated in block 512, then raised to the Xorder and multiplied times the DCT signal to produce the X product, in block 516. Finally the Xorder differential signal (see FIG. 4C) is generated in block 518 in accordance with a version of equation (10) as explained above according to the predetermined order of differentiation, and as shown in the block diagram of FIG. 6. If the Xorder of differentiation is even in decision block 600, then the X direction differentiated signal is generated in block 606 according to a variation of equation (10) (whereby the sine function is replaced by a cosine function) by multiplying the X product times the forward DCT basis matrix $FB_{COS}$, then normalizing the result. When the X order of differentiation is odd in decision block 600, then a forward discrete even sine transform (DEST or DST) basis matrix $FB_{sin}$ is produced in block 602. The X direction differentiated signal is thereafter determined in block 604 in accordance with equation (10), by multiplying the X product times the DST basis matrix $FB_{sin}$, then normalizing the result. The above use of sine and cosine basis matrices is equally applicable when performing inverse orthogonal functions.

After edge detection in the X direction is completed in block 518, the question is presented in decision block 520 as to whether edge detection in the Y direction is desired. If the answer is yes then differentiation in the Y direction is provided in blocks 524 through 532, otherwise the method continues with the step of binarizing the output signal in block 538. In block 524 the Y direction order of differentiation is selected where selection can occur by operator input, retrieval from memory, or real time processing according to predetermined criteria. The above description of differentiation in the X direction is paralleled below for differentiation in the Y direction with appropriate substitutions of y for x, $\delta_y$ for $\delta_x$ and Yorder for Xorder.

Specifically, the hybrid IDCT of equation (4), which was differentiated to the first order in the X direction in equation (10), can be differentiated to the Yorder in the Y direction so that $$\hat{s}^{Yorder}(y) = -\sqrt{\frac{2}{N}} \sum_{v=0}^{N-1} C_v \frac{v\pi}{N\delta_y} S(v) trig\left(\frac{(2y+\delta y)v\pi}{2N\delta_y}\right) \quad (11)$$

where trig=sine for Yorder=odd and trig=–cosine for Yorder=even.

From equation (11) the Y factor is generated in block 526 and defined as $$\left(-\frac{v\pi}{N\delta_y}\right)$$

and the Y product is generated in block 530 and defined as $$\left(-\frac{v\pi}{N\delta_y}\right)^{Yorder} S(v),$$

where the Yorder is the predetermined order of differentiation in the Y direction as selected in block 524. The differentiation of equation (4) in the Y direction where the Yorder is odd takes the form $$\left(-\frac{v\pi}{N\delta_y}\right)^{Yorder} S(v)\sin\left(\frac{(2y+\delta y)v\pi}{2N\delta_y}\right)$$

whereas the differentiation of equation (4) in the Y direction where the Yorder is even takes the form $$\left(-\frac{v\pi}{N\delta_y}\right)^{Yorder} S(v)\cos\left(\frac{(2y+\delta y)v\pi}{2N\delta_y}\right).$$

The Y factor is generated in block 526, then raised to the Yorder and multiplied times the DCT signal to produce the Y product in block 530. Finally, the Y direction differentiated signal is generated in block 532 in accordance with equation (11) and the steps shown in the block diagram of FIG. 7. If the Yorder of differentiation is even in decision block 700, then the Y direction differentiated signal is generated in block 706 according to equation (11) by multiplying the Y product times the forward DCT basis matrix $FB_{COS}$ (i.e. trig=–cosine), then normalizing the result. When the Y order of differentiation is odd in decision block 700, then the forward DST basis matrix $FB_{sin}$ is produced in block 702 (i.e. trig=sine), followed by the Y direction differentiated signal being generated in block 704 in accordance with equation (10) by multiplying the Y product times the forward DST basis matrix $FB_{sin}$, then normalizing the result. If edge detection has been determined in both the horizontal and vertical directions, then the query of decision block 534 in FIG. 5 is answered in the affirmative, otherwise the method continues with the step of binarizing the output signal in block 538. When edge detection occurs in both directions, a gradient signal GI is generated in block 536 of the current example by taking the square root of the sum of the squares of the X direction differential signal and the Y direction differential signal.

Block 538 receives either (1) an X direction differentiated signal from block 520, (2) a Y direction differentiated signal from block 534, or (3) a gradient signal GI differentiated in both the X and Y directions from block 536. The signal received in block 538 is then compared on a bit-by-bit basis to an experimentally predetermined threshold value $\alpha$ as shown in FIG. 4D whereupon corresponding binarized output pixels are assigned to values of 1 or 0 depending upon whether the magnitude of each pixel of the received signal is greater than, equal to, or less than the predetermined threshold value. The predetermined threshold value of $\alpha$ is arbitrarily selected as well known to those skilled in the art according to design requirements for the edge detection system of interest. Exemplary boundary extraction techniques utilizing waveform comparisons to predetermined threshold values are described in "Fundamentals of Digital Image Processing" by A. K. Jain (Prentice Hall) 1989 pp. 357–362 which are herein incorporated by reference in their entirety.

Figure 8:
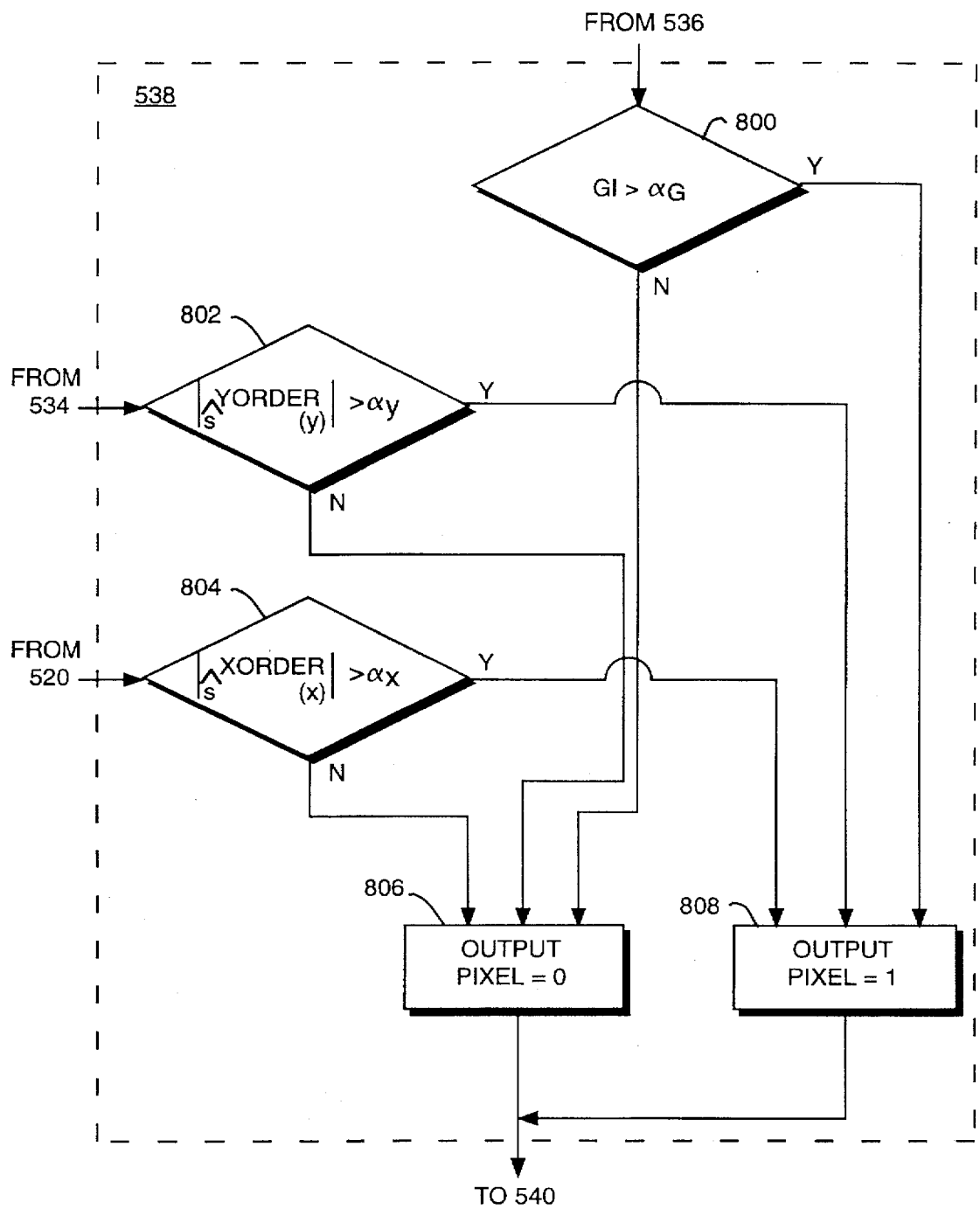
FIG. 8 is a flowchart showing further detailed steps for binarizing the output signal according to block 538 of FIG. 5.

In the case of two dimensional edge detection, the gradient signal will always represent a magnitude. However, when edge detection is taken in only one dimension, the magnitude is represented as the absolute value of the differentiated signal. Specifically, if the gradient signal GI is greater than a predetermined gradient threshold value $\alpha_g$ as queried in decision block 800 of FIG. 8, then the corresponding binarized output pixel $s_b(y,x)$ is set equal to 1 in block 808, otherwise the corresponding binarized output pixel $s_b(y,x)$ is set equal to 0 in block 806.

If edge detection is selected only in the X direction by answering yes to the query of decision block 506 and no to the query of decision block 520, then the signal received in block 538 from block 520 will enter the decision block 804. If the absolute value of the X order differentiated signal $\hat{s}^{xorder}(x)$ is greater than a predetermined X direction threshold value $\alpha_x$ (such as the $\alpha$ shown in FIG. 4D), then the corresponding binarized output pixel $s_b(x)$ is set equal to 1 in block 808, otherwise the corresponding binarized output pixel $s_b(x)$ is set equal to 0 in block 806 (see also FIG. 4E). Similarly, if edge detection is selected only in the Y direction by answering no to the query of decision block 506 and no to the query of decision block 534, then the signal received in block 538 from block 534 will enter the decision block 802. If the absolute value of the Y order differentiated signal $\hat{s}^{yorder}(y)$ is greater than a predetermined Y direction threshold value $\alpha_y$, then the corresponding binarized output pixel $s_b(y)$ is set equal to 1 in block 808, otherwise the corresponding binarized output pixel $s_b(y)$ is set equal to 0 in block 806.

Finally, an edge detected output image is printed or otherwise transferred in block 540 in response to the binarized output signal (i.e. a physical, electrical signal, representing particular voltages and currents) received from block 538. The binarized, two-dimensionally edge detected output signal corresponding to the input image of FIG. 3A is shown in FIG. 3B, and further thinned by a conventional thinning algorithm to produce the result shown in FIG. 3C. Differentiation in the horizontal X direction would only produce edges 302 and 306 whereas differentiation in the vertical Y direction would only produce edges 300 and 304.

Figure 9:
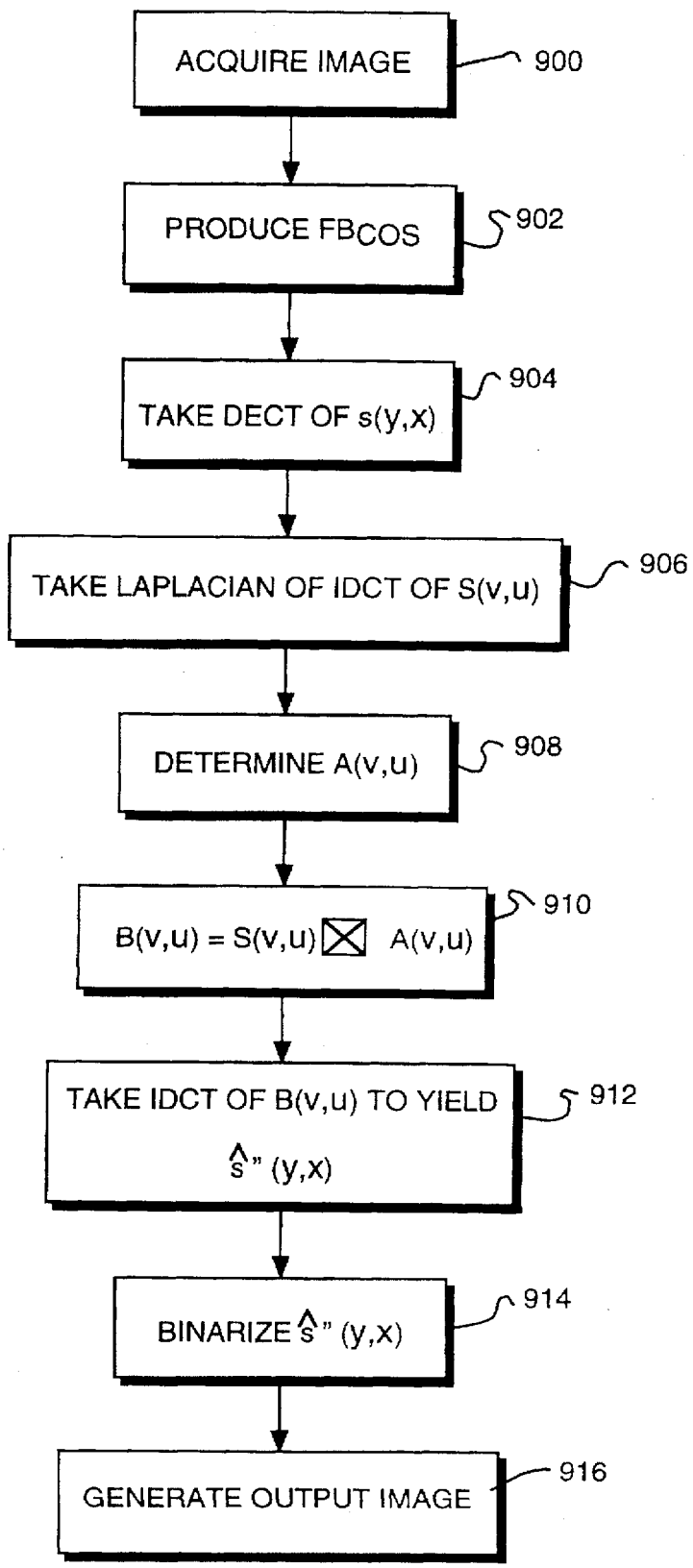
FIG. 9 is a flowchart of a second preferred method of edge detection in two dimensions using Laplacian transforms with DCT processing, applicable to the system of FIG. 2A.

The edge detection system of FIG. 2A is further exemplified by the following second preferred edge detection method of FIG. 9 which combines Laplacian transforms with DST/DCT processing.

An image is acquired in block 900 of FIG. 9 as an electrical signal represented in eight point segments of image data points $s(j,i)$. A two-dimensional forward basis matrix $FB_{COS}$ of the forward DCT is derived in block 902 from the cosine terms of equation (7) for N=8 indexed first on u and v and then on i and j. The DCT of $s(j,i)$ is taken in block 904 yielding DCT coefficients $S(v,u)$ in accordance with equation (7) for the segment size of N=8. In block 906, the Laplacian transform of the IDCT of $S(v,u)$ according to equation (8) is determined as:

$$\nabla^2 \hat{s}(y,x) = \qquad (12)$$

$$\hat{s}''(y,x) = \frac{2}{N} \sum_{v=0}^{N-1} \sum_{u=0}^{N-1} C_v C_u S(v,u) \left\{ \left(\frac{v\pi}{N\delta y}\right)^2 + \left(\frac{u\pi}{N\delta x}\right)^2 \right\}$$

$$\cos\frac{(2y+\delta y)v\pi}{2N\delta y} \cos\frac{(2x+\delta x)u\pi}{2N\delta x}$$

where $$\left\{ \left(\frac{v\pi}{N\delta y}\right)^2 + \left(\frac{u\pi}{N\delta x}\right)^2 \right\}$$

can be expressed in matrix form as $$A(v,u) = \left\{ \left(\frac{v\pi}{N\delta y}\right)^2 + \left(\frac{u\pi}{N\delta x}\right)^2 \right\}. \qquad (13)$$

For 8×8 blocks, i.e. $0 \leq u$ and $v \leq 7$, $$A = \begin{matrix}
0.000 & 0.154 & 0.617 & 1.388 & 2.467 & 3.855 & 5.552 & 7.556 \\
0.154 & 0.308 & 0.771 & 1.542 & 2.622 & 4.010 & 5.706 & 7.711 \\
0.617 & 0.771 & 1.234 & 2.005 & 3.084 & 4.472 & 6.169 & 8.173 \\
1.388 & 1.542 & 2.005 & 2.776 & 3.855 & 5.243 & 6.940 & 8.944 \\
2.467 & 2.622 & 3.084 & 3.855 & 4.935 & 6.323 & 8.019 & 10.024 \\
3.855 & 4.010 & 4.472 & 5.243 & 6.323 & 7.711 & 9.407 & 11.412 \\
5.552 & 5.706 & 6.169 & 6.940 & 8.019 & 9.407 & 11.103 & 13.108 \\
7.556 & 7.711 & 8.173 & 8.944 & 10.024 & 11.412 & 13.108 & 15.113
\end{matrix}$$

as generated in block 908. Equation (12) can be rewritten as $$\nabla^2 \hat{s}(y,x) = \hat{s}''(y,x) = \frac{2}{N} \sum_{v=0}^{N-1} \sum_{u=0}^{N-1} C_v C_u B(v,u) \qquad (14)$$

$$\cos\frac{(2y+\delta y)v\pi}{2N\delta y} \cos\frac{(2x+\delta x)u\pi}{2N\delta x}$$

where $B(v,u)=A(v,u) \cdot S(v,u)$, i.e. $B(v,u)$ is the point-by-point product of the matrix $A(v,u)$ times the matrix $S(v,u)$ as depicted by the mask multiplication of block 910. From the above it is clear that the second order derivative of the reconstructed spatial domain matrix $\hat{s}''(y,x)$ is merely the inverse DCT of $B(v,u)$, as generated in block 912. The differentiated signal $\hat{s}''(y,x)$ is then binarized in block 914 by comparing point values on a bit-by-bit basis to the empirically predetermined threshold value $\alpha$, and assigning corresponding output pixels to values of 1 or 0 depending upon whether the magnitude of each pixel of the received signal is greater than, equal to, or less than the predetermined threshold value (see FIG. 4D for the one-dimensional case). Finally, an edge detected output image is produced by a printer or other output device in block 916 in response to the binarized output signal received from block 914.

4. IMAGE REFLECTION

Figure 10A:
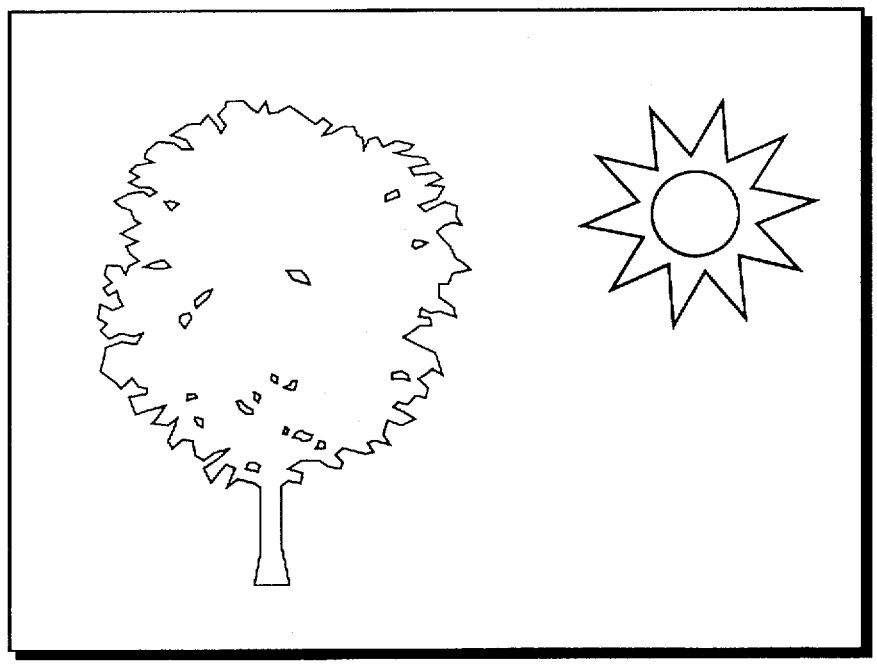
FIGS. 10A and 10B illustrate the concept of image reflection where
Figure 10B:
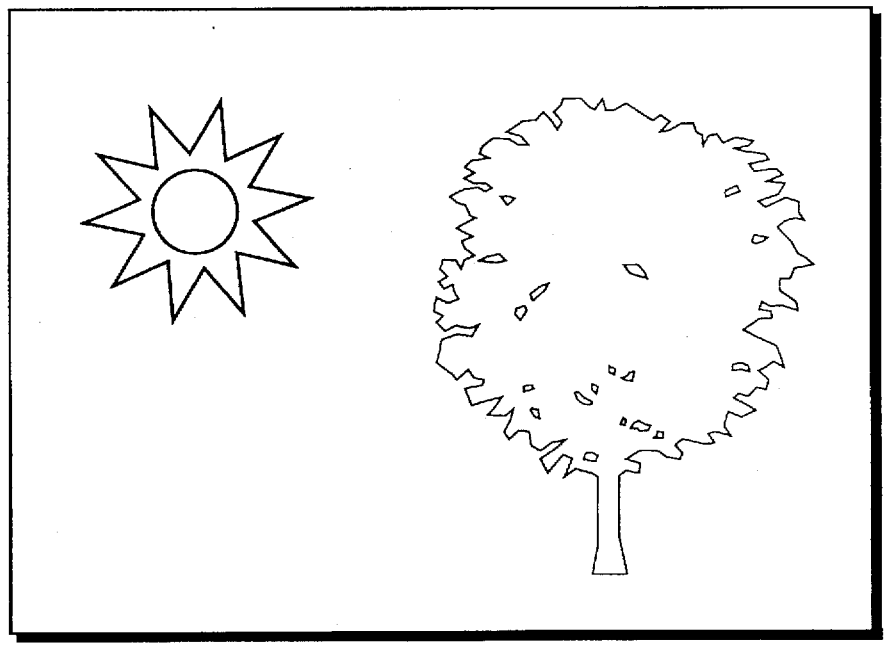

In addition to edge detection, the image processing system of FIG. 2A is also useful for processing an image (FIG. 10A) to generate a reflected image (FIG. 10B). The DCT/IDCT processor 214 receives the 8×8 blocks of reconstructed image data points from the buffer 222 (e.g. for the two-dimensional case) which are multiplied in matrix multiplier 214 times a modified IDCT basis matrix received at port B from memory 218. The CPU 228 predetermines a modified basis matrix $IB_{MOD}$ and stores it in memory 218 according to the following variation of IDCT equation (8).

$$\hat{s}((N-1)\delta y - y, (N-1)\delta x - x) = \frac{1}{4} \sum_{v=0}^{N-1} \sum_{u=0}^{N-1} C_v C_u S(v,u) \qquad (15)$$

$$\cos\frac{(2(N\delta y + \delta y) + \delta y)v\pi}{2N\delta y} \cos\frac{(2(N\delta x + x) + \delta x)u\pi}{2N\delta x}$$

where $0 \leq x \leq (N-1)\delta x$ and $0 \leq y \leq (N-1)\delta y$ for N=8. The following matrix $IB_{MOD}$ was determined from equation (15) for the special case where $\delta x = \delta y = 1$ and $x = y = 1$.

$$IB_{MOD} =$$

$$\begin{pmatrix} 0.707 & -0.981 & 0.924 & -0.831 & 0.707 & -0.556 & 0.383 & -0.195 \\ 0.707 & -0.831 & 0.383 & 0.195 & -0.707 & 0.981 & -0.924 & 0.556 \\ 0.707 & -0.556 & -0.383 & 0.981 & -0.707 & -0.195 & 0.924 & -0.831 \\ 0.707 & -0.195 & -0.924 & 0.556 & 0.707 & -0.831 & -0.383 & 0.981 \\ 0.707 & 0.195 & -0.924 & -0.556 & 0.707 & 0.831 & -0.383 & -0.981 \\ 0.707 & 0.556 & -0.383 & -0.981 & -0.707 & 0.195 & 0.924 & 0.831 \\ 0.707 & 0.831 & 0.383 & -0.195 & -0.707 & -0.981 & -0.924 & -0.556 \\ 0.707 & 0.981 & 0.924 & 0.831 & 0.707 & 0.556 & 0.383 & 0.195 \end{pmatrix}$$

Equation (8) can also be expressed as, $$\hat{s}((N-1)\delta y - y,(N-1)\delta x - x) = (IB_{MOD} \times s(v,u))^T \times IB_{MOD} \quad (16)$$

where:

$\hat{s}((N-1)\delta y - y,(N-1)\delta x - x)$ is the reconstructed matrix of image data points in the spatial domain;

$S(v,u)$ is the DCT matrix; and $IB_{MOD}$ is the modified IDCT basis matrix.

The result of the above matrix multiplication in multiplier 214 is a first matrix which is transposed in transposer 217. The modified inverse basis matrix $IB_{MOD}$ is received at port A and the reflected reconstructed signal $((N-1)\delta y-y,(N-1)\delta x-x)$ is generated from the matrix multiplier 215 by multiplying the transposed matrix times $IB_{MOD}$. Block to raster converter 210 receives $\hat{s}((N-1)\delta y-y,(N-1)\delta x-x)$ from processor 214, then discards pixels as necessary to compensate for overlapping prior to the DCT transformation.

Finally, the signals are transmitted from the converter 210 through the threshold converter 208 in pass through mode so that the reflected image represented by $\hat{s}((N-1)\delta y-y,(N-1)\delta x-x)$ is written directly to the video memory 202 and thereafter viewed on the display 204 in accordance with a control signal received on an address bus from controller 224. In accordance with the preferred embodiment which utilizes equation (15), each reflected segment stored in video memory 202 corresponds to one 8×8 image segment from the original image.

By using the above modified IDCT basis matrix $IB_{MOD}$ when generating the IDCT in processor 214, the resulting 8×8 block of reconstructed image data points in the spatial domain is reflected about both the horizontal and vertical axes. To reflect the entire image the individual blocks must, of course, be reordered as is well known by those of ordinary skill in the art. For instance, one method of reordering the reflected blocks or segments involves storing each reflected segment into the video memory 202 starting with the last memory location and working backwards, so that when the video memory 202 receives the signal from the controller 224 to send the reflected image segments to the display 204, the first segment to be displayed on display 204 will correspond with the last segment stored in video memory 202.

The above described image processing system of FIG. 2A provides for both image reflection and edge detection according to the invention as claimed. However, it is to be understood that the above described embodiments are merely illustrative of the present invention and represent a limited number of the possible specific embodiments that can provide applications of the principles of the invention. Numerous and varied other arrangements may be readily devised in accordance with these principles by those skilled in the art without departing from the spirit and scope of the invention as claimed.

What is claimed is:

1. An image edge detection system comprising:

an image acquisition device for acquiring and converting an image into an image signal;

a first memory for receiving and storing said image signal;

a raster to block converter for segmenting said image signal into segments of predefined size;

a transformation section for transforming said segmented image signal into discrete cosine transform (DCT) coefficients, taking an inverse discrete cosine transform (IDCT) of the DCT coefficients, and differentiating the IDCT coefficients to generate a differentiated signal;

a block to raster converter for converting the differentiated signal into raster format then sending the converted differentiated signal to said first memory;

a threshold comparator for binarizing said converted differentiated signal by comparing said converted differentiated signal with a predetermined threshold value;

an output device for outputting, from said first memory, said binarized converted differentiated signal representing an edge detected image; and a controller for controlling said system in accordance with predetermined instructions from a central processing unit.

2. The system of claim 1, wherein said transformation section comprises a second memory, a third memory, a first matrix multiplier, a second matrix multiplier, a transposer, a mask multiplier and a buffer, said transformation section generating said differentiated signal by:

said first matrix multiplier multiplying the segmented image signal received from the raster to block converter times a predetermined DCT basis matrix received from the second memory to generate a first signal;

said transposer transposing the first signal;

said second matrix multiplier multiplying the transposed first signal times the DCT basis matrix received from the second memory to produce a second signal;

said mask multiplier generating a mask multiplied signal by mask multiplying the second signal times a Laplacian matrix received from the third memory;

said buffer storing said mask multiplied signal;

said second matrix multiplier multiplying said mask multiplied signal received from said buffer times said IDCT basis matrix received from said second memory to produce a third signal;

said transposer transposing said third signal; and said first matrix multiplier multiplying said transposed third signal times said IDCT basis matrix received from said second memory to produce said differentiated signal, said differentiated signal representing an edge detected image.

3. The system of claim 2, wherein said controller generates said predetermined IDCT basis matrix as a modified IDCT basis matrix evaluated at {y,x} where y and x are real number coordinate values.

4. An image edge detection system comprising:

means for acquiring an input signal corresponding to an input image represented in an XY plane, X representing a coordinate in a horizontal direction and Y representing a coordinate in a vertical direction, said input signal comprising values of input pixels of said input image, said values defining at least one spatial domain matrix spanning over a given range;

means for producing a forward discrete even cosine transform (DCT) basis matrix, an inverse discrete even cosine transform (IDCT) basis matrix, and an inverse discrete even sine transform (IDST) basis matrix;

means for producing a DCT signal comprising DCT coefficients of at least one DCT matrix by multiplying said forward DCT basis matrix times said at least one spatial domain matrix;

means for selecting a predetermined order of a derivative of said input signal in one of said horizontal and vertical directions;

means for generating a predetermined factor dependent upon a resampling interval by differentiating said forward DCT basis matrix to a first order;

means for determining said factor raised to said predetermined order;

means for generating a product by mask multiplying said factor raised to the predetermined order of the derivative times said DCT signal;

means for generating a differentiated signal of said input signal by multiplying said product times said IDCT basis matrix when said predetermined order is even, and by multiplying said product times said IDST basis matrix when said predetermined order is odd; and means for generating an output image in response to said differentiated signal, said output image being edge detected in said one direction.

5. The system of claim 4, wherein said means for generating an output image comprises means for binarizing said differentiated signal by comparing said differentiated signal to a predetermined threshold value.

6. The system of claim 4, wherein said means for producing basis matrices generates said predetermined IDCT basis matrix as a modified IDCT basis matrix evaluated at $\{y,x\}$ where y and x are real number coordinate values.

7. An image edge detection system comprising:

means for acquiring an input signal corresponding to an input image represented in an XY plane, X representing a coordinate in a horizontal direction and Y representing a coordinate in a vertical direction, said input signal comprising values of input pixels of said input image, said values defining at least one spatial domain matrix spanning over a given X range in the X direction and a given Y range in the Y direction;

means for producing a forward discrete even cosine transform (DCT) basis matrix, a forward discrete even sine transform (DST) basis matrix, an inverse discrete even cosine transform (IDCT) basis matrix and an inverse discrete even sine transform (IDST) basis matrix;

means for producing a DCT signal comprising DCT coefficients of at least one DCT matrix by multiplying said forward DCT basis matrix times said at least one spatial domain matrix;

means for selecting a predetermined X order of an X derivative in the X direction;

means for generating a predetermined X factor dependent on an X direction resampling interval by differentiating said forward DCT basis matrix to a first order with respect to X;

means for determining said X factor raised to said predetermined X order;

means for generating an X product by mask multiplying said X factor raised to the predetermined X order times said DCT signal;

means for generating an X differentiated signal by multiplying said X product times said forward DCT basis matrix when said predetermined X order is even, and by multiplying said X product times said DST basis matrix when said predetermined X order is odd;

means for selecting a predetermined Y order of a Y derivative in the Y direction;

means for generating a predetermined Y factor dependent on a Y direction resampling interval by differentiating said forward DCT basis matrix to a first order with respect to Y;

means for determining said Y factor raised to said predetermined Y order;

means for generating a Y product by mask multiplying said Y factor raised to the predetermined Y order times said DCT signal;

means for generating a Y differentiated signal by multiplying said Y product times said forward DCT basis matrix when said predetermined Y order is even, and by multiplying said second Y times said DST basis matrix when said predetermined Y order is odd;

means for generating a gradient signal by taking the square root of the sum of the squares of the X differentiated signal and the Y differentiated signal; and means for generating an output image in response to said gradient signal, said output image being edge detected in both the X and Y directions.

8. The system of claim 7, wherein said means for generating an output image comprises means for binarizing said gradient signal by comparing said gradient signal to a predetermined threshold value.

9. The system of claim 7, wherein said means for producing basis matrices generates said predetermined IDCT basis matrix as a modified IDCT basis matrix evaluated at $\{y,x\}$ where y and x are real number coordinate values.

10. An image edge detection method comprising the steps of:

acquiring and converting an image into an image signal;

receiving and storing said image signal;

segmenting said image signal into segments of predefined size;

transforming said segmented image signal into discrete cosine transform (DCT) coefficients, taking an inverse discrete cosine transform (IDCT) of the DCT coefficients, and differentiating the IDCT coefficients to generate a differentiated signal;

converting the differentiated signal into raster format;

binarizing said converted differentiated signal by comparing said converted differentiated signal with a predetermined threshold value;

outputting said binarized converted differentiated signal representing an edge detected image; and controlling said system in accordance with predetermined instructions from a central processing unit.

11. The method of claim 10 wherein the step of taking an inverse discrete cosine transform (IDCT) of the DCT coefficients is accomplished using a modified IDCT basis matrix evaluated at $\{y,x\}$ where y and x are real number coordinate values.

* * * * *